(12) United States Patent
Das et al.

(10) Patent No.: US 10,171,376 B2
(45) Date of Patent: Jan. 1, 2019

(54) ALLOCATION OF CLIENT DEVICE MEMORY FOR CONTENT FROM CONTENT SOURCES

(71) Applicant: Google Technology Holdings LLC, Mountain View, CA (US)

(72) Inventors: Sujoy Das, Grayslake, IL (US); Jagadish K Agrawal, Grayslake, IL (US); Nathan J Fortin, Morgan Hills, CA (US); Jordan Andrew Hurwich, Palo Alto, CA (US)

(*) Notice: Subject to any disclaimer, the term of this patent is extended or adjusted under 35 U.S.C. 154(b) by 0 days.

(21) Appl. No.: 15/407,777

(22) Filed: Jan. 17, 2017

(65) Prior Publication Data

US 2017/0126584 A1    May 4, 2017

Related U.S. Application Data

(62) Division of application No. 14/298,130, filed on Jun. 6, 2014.

(Continued)

(51) Int. Cl.
*H04L 12/911* (2013.01)
*G06F 9/50* (2006.01)
*H04L 29/08* (2006.01)

(52) U.S. Cl.
CPC .......... *H04L 47/783* (2013.01); *G06F 9/5016* (2013.01); *H04L 67/22* (2013.01); *H04L 67/303* (2013.01)

(58) Field of Classification Search
CPC ............ G06F 17/30867; G06F 9/5016; G06F 17/30864; G06F 12/023; G06F 12/0871;
(Continued)

(56) References Cited

U.S. PATENT DOCUMENTS 8,005,975 B2    8/2011 Liu
8,078,729 B2    12/2011 Kozat et al.
(Continued)

FOREIGN PATENT DOCUMENTS

EP    0959410 A2    11/1999

OTHER PUBLICATIONS

United States Patent and Trademark Office; Final Office Action; U.S. Appl. No. 14/298,130; dated Nov. 17, 2016.
(Continued)

*Primary Examiner* — Vivek Srivastava
*Assistant Examiner* — Todd L Barker
(74) *Attorney, Agent, or Firm* — McDonnell Boehnen Hulbert & Berghoff LLP

(57) ABSTRACT

A client device presents content received from various content sources to a user. Different portions of the client device's memory are allocated for storing content from different content sources. The client device determines a quality score for a content source based on usability of content received from the content source. Based on the quality score for a content source, the client device allocates a portion of its memory for content from the content source. Additionally, if content from a content source is larger than an amount of memory allocated for the content source, the client device stores a portion of the content and requests storage of an additional portion of the content by an additional client device. When the client device has sufficient memory to store the content, the additional portion is retrieved from the additional client device and combined with the portion of the content.

12 Claims, 3 Drawing Sheets

Related U.S. Application Data

(60) Provisional application No. 61/969,803, filed on Mar. 24, 2014.

(58) Field of Classification Search
CPC ..... G06F 2212/1044; G06F 2212/2515; G06F 2212/601; H04L 47/783; H04L 67/06; H04L 67/2852; H04L 67/22; H04L 67/303; H04L 47/83; H04L 67/1097; H04L 29/08144; G11B 27/034; G11B 27/105; H04N 21/4316; G06Q 30/0255; G06Q 30/0257; G06Q 30/02
See application file for complete search history.

(56) References Cited

U.S. PATENT DOCUMENTS

| | | | |
|---|---|---|---|
| 8,200,747 B2 | 6/2012 | Apostolopoulos et al. | |
| 8,214,619 B1 | 7/2012 | Connolly et al. | |
| 8,316,098 B2 | 11/2012 | Luna et al. | |
| 8,504,774 B2 | 8/2013 | Khawand et al. | |
| 8,595,315 B2 | 11/2013 | Grannan | |
| 8,694,016 B2 * | 4/2014 | Ahuja | H04W 72/005 370/329 |
| 8,745,329 B2 | 6/2014 | Kadatch et al. | |
| 8,751,743 B2 | 6/2014 | Burge, III | |
| 8,775,737 B2 * | 7/2014 | Hsieh | G06F 12/023 711/118 |
| 8,874,558 B1 * | 10/2014 | He | G06F 17/30864 707/706 |
| 8,949,874 B1 * | 2/2015 | Li | H04N 21/442 725/14 |
| 9,064,011 B2 * | 6/2015 | Maharajh | G06F 17/30035 |
| 9,071,655 B2 * | 6/2015 | Brown | H04L 67/322 |
| 9,292,448 B2 | 3/2016 | Daly | |
| 9,294,562 B2 | 3/2016 | Gong | |
| 9,774,488 B2 * | 9/2017 | Singhal | H04L 67/06 |
| 2003/0101325 A1 | 5/2003 | Desoli et al. | |
| 2003/0154485 A1 * | 8/2003 | Johnson | G11B 27/034 725/89 |
| 2006/0126556 A1 * | 6/2006 | Jiang | H04L 12/18 370/328 |
| 2007/0260822 A1 | 11/2007 | Adams | |
| 2008/0039058 A1 | 2/2008 | Ray | |
| 2008/0139189 A1 * | 6/2008 | Hyatt | H04L 67/2852 455/418 |
| 2008/0262912 A1 * | 10/2008 | Gargi | G06Q 30/0241 705/14.4 |
| 2009/0017750 A1 | 1/2009 | Marcinkiewicz | |
| 2010/0077174 A1 * | 3/2010 | Ma | G06F 9/5011 711/171 |
| 2011/0029466 A1 * | 2/2011 | Liu | G06F 17/3053 706/12 |
| 2011/0246599 A1 | 10/2011 | Kawada | |
| 2012/0158711 A1 * | 6/2012 | Curtiss | G06F 17/30864 707/723 |
| 2012/0198075 A1 | 8/2012 | Crowe et al. | |
| 2012/0215773 A1 * | 8/2012 | Si | G06F 17/30864 707/723 |
| 2012/0215851 A1 | 8/2012 | Wu et al. | |
| 2012/0271903 A1 | 10/2012 | Luna | |
| 2013/0110637 A1 | 5/2013 | Bott | |
| 2014/0047059 A1 | 2/2014 | Brownlow et al. | |
| 2014/0047516 A1 | 2/2014 | Deshpande et al. | |
| 2014/0098766 A1 | 4/2014 | Misra et al. | |
| 2014/0258366 A1 | 9/2014 | L'Heureux et al. | |
| 2014/0280669 A1 * | 9/2014 | Harper, III | G06F 15/167 709/213 |
| 2015/0039424 A1 * | 2/2015 | Narravula | G06Q 30/0255 705/14.53 |
| 2015/0121413 A1 * | 4/2015 | Ramakrishnan | H04N 21/454 725/25 |
| 2015/0181002 A1 | 6/2015 | Lee et al. | |
| 2015/0189024 A1 | 7/2015 | Misra et al. | |
| 2015/0271096 A1 | 9/2015 | Das et al. | |

OTHER PUBLICATIONS

United States Patent and Trademark Office; Non-Final Office Action; U.S. Appl. No. 14/298,130; dated May 6, 2016.

United States Patent and Trademark Office; Final Office Action; U.S. Appl. No. 14/298,130; dated Sep. 21, 2015.

United States Patent and Trademark Office; Non-Final Office Action; U.S. Appl. No. 14/298,130; dated Apr. 13, 2015.

Microsoft; "asp.net WEB APT:HTTP Message Lifecycle"; 2012 (1 page).

Oyman et al.; "Quality of Experience for HTTP Adaptive Streaming Services"; Apr. 2012; IEEE Communications; 6 pages total.

ETSI, ETSI TS 126 247 v 10.0.0 Universal Mobile Telecommunications System (UTMS) Technical Specification; Nov. 2011; 96 pages total.

* cited by examiner

ALLOCATION OF CLIENT DEVICE MEMORY FOR CONTENT FROM CONTENT SOURCES

CROSS REFERENCE TO RELATED APPLICATIONS

This application is a divisional application of U.S. application Ser. No. 14/298,130, filed Jun. 6, 2014, which claims the benefit of U.S. Provisional Application No. 61/969,803, filed Mar. 24, 2014, which are incorporated by reference in their entirety.

BACKGROUND

This disclosure generally relates to memory allocation, and more specifically to allocation of memory for different content.

Users of computing devices interact with an increasing amount of content, many computing devices having become more portable. While increasing the convenience of computing device use, increasing the portability of computing devices can limit certain resources. For example, as computing devices become smaller, the smaller size constrains resources available for various components of computing devices.

However, an increasing amount of content from various sources is available for consumption by a computing device. Additionally, the size of available content increases, allowing higher-resolution or more detailed content to be accessed from sources. This increase in content size may limit a user's ability to fluidly interact with content via a computing device. For example, content from a source may have a larger size than the amount of storage available on a user's computing device, which may limit the user from accessing a portion of the content from the source.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A client device allocates memory for use by various content sources, so content from different content sources is stored in different portions of the memory. Additionally, the client device may partition content from a content source so a portion of the content is stored in the client device's memory and an additional portion of the content is stored in an additional client device's memory. For example, if a size of content from a content source exceeds an amount of memory allocated by the client device for use by the content source, the client device requests use of a portion of a memory of an additional client device to store a portion of the content. The client device determines a portion of content from the content source to be stored in the client device's memory and identifies an additional portion of the content to an additional client device for storage in the additional client device's memory. The additional client device requests the additional portion of the content from the content source and stores the additional portion in its memory. When the client device determines that the amount of its memory allocated for use by the content source is sufficient to store the content, the client device retrieves the additional portion of the content from the additional client device and combines the portion of the content stored in its memory with the additional portion of the content stored by the additional client device.

Additionally, the client device identifies content received from different content sources and determines a measure of usability of content received from different content sources. Based on the measures of usability, the client device determines quality scores for each content source from which content was received and allocates a portion of the client device's memory for a content source based on the quality score of the content source. For example, the client device determines a total quality score by combining quality scores for all content sources from which content was received and determines a ratio of the quality score of a content source to the total quality score. An amount of the client device's memory is allocated for the content source based on the ratio. In one embodiment, a percentage of the client device's available memory is allocated for a content source based on the ratio of the quality score for the content source to the total quality score. The client device may modify allocation of its memory among content sources at a periodic interval to improve user interaction with content.

System Architecture

Figure 1:
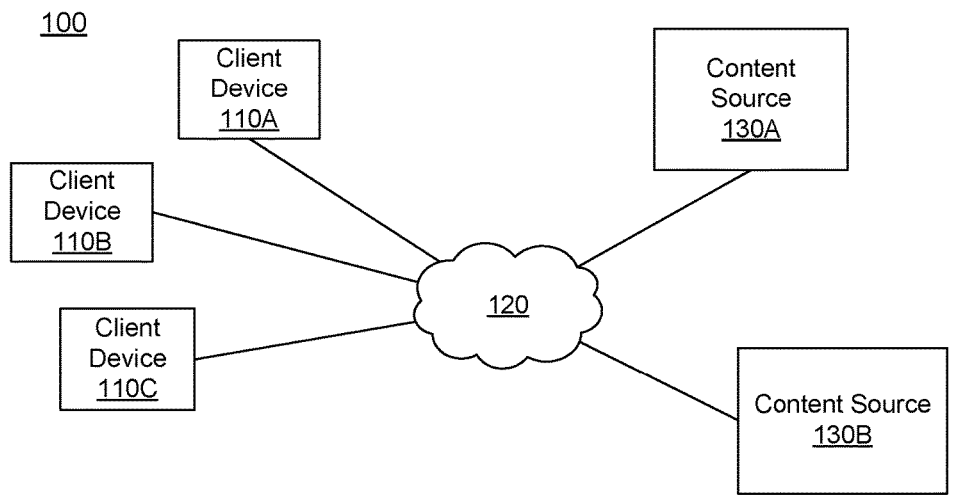
FIG. 1 is a block diagram of a system environment, in accordance with an embodiment.

FIG. 1 is a block diagram of a system environment 100 including multiple client devices 110A, 110B, 110C (also referred to individually and collectively using reference number 110), a network 120, and multiple content sources 130A, 130B (also referred to individually and collectively using reference number 130). In various embodiments, any number of client device 110 or content sources 130 are included in the system environment 110. Additionally, in alternative configurations, different and/or additional components may be included in the system environment 100.

A client device 110 is one or more computing devices capable of receiving user input as well as transmitting and/or receiving data via the network 120. In one embodiment, the client device 110 is a computer system, such as a desktop or a laptop computer. Alternatively, the client device 110 is any device with computing functionality, such as a personal digital assistant (PDA), a mobile telephone, a smartphone, a tablet computer or another suitable device. A client device 110 may include instructions for executing one or more applications that modify data or exchange data with a content source 130. For example, the client device 110 executes a browser that receives content from a content source 130 and presents the content to a user of the client device 110. In another embodiment, the client device 110 interacts with a content source 130 through an application programming interface (API) running on a native operating system of the client device 110, such as IOS® or ANDROID™. An example client device 110 is further described below in conjunction with FIG. 2. While FIG. 1 shows three client devices 110A, 110B, 110C, in various embodiments, any number of client devices 110 may be included in the system environment 100.

The client devices 110A, 110B, 110C and the content sources 130A, 130B communicate with each other via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

A content source 130 is a computing system capable of providing various types of content to a client device 110. Examples of content provided by a content source 130 include text, images, video, or audio on web pages, web feeds, social networking information, messages, or other suitable data. Additional examples of content include user-generated content such as blogs, tweets, shared images, video or audio, social networking posts, and social networking status updates. Content provided by a content source 130 may be received from a publisher and distributed by the content source 130, or a content source 130 may generate and distribute content itself. For convenience, content from a content source 130, regardless of its composition, may be referred to herein as a "content item" or as "content." Content provided by a content source 130 may include multiple types of data, such as text data, image data, video data, or audio data.

Figure 2:
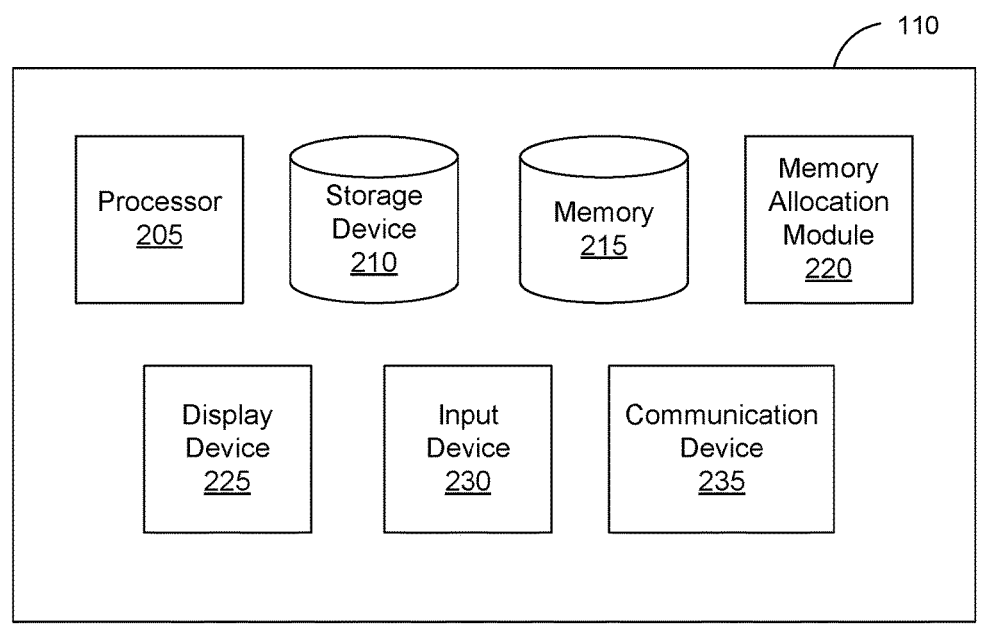
FIG. 2 is a block diagram of a client device, in accordance with an embodiment.

FIG. 2 is a block diagram of one embodiment of a client device 110. In the example shown by FIG. 2, the client device 110 includes a processor 205, a storage device 210, a memory 215, a memory allocation module 220, a display device 225, an input device 230, and a communication module 235. However, in other embodiments, the client device 110 may include different and/or additional components than those described in conjunction with FIG. 2.

The client device 110 includes one or more processors 205, which retrieve and execute instructions from the storage device 210 or the memory 215. Additionally, a processor 205 receives information from the input device 230 and executes one or more instructions included in the received information. The storage device 210 is a persistent storage device including data and/or instructions for execution by the processor 205 or for presentation to a user of the client device. Examples of a storage device 210 include a solid-state drive, a flash memory drive, a hard drive, or other suitable persistent storage device.

The memory 215 stores instructions for execution by one or more processor 205. In various embodiments, the memory 215 is a volatile storage medium, while the storage device 210 is a non-volatile storage medium. Examples of a volatile storage medium include random access memory (RAM), static random access memory (SRAM), and dynamic random access memory (DRAM). Storing data or instructions in the memory 215 allows a processor 205 to retrieve the data or instructions more rapidly than data or instructions stored in the storage device 210. The data or instructions included in the memory 215 may be modified at various time intervals or in response to data received from a processor 205.

In one embodiment, the memory 215 is partitioned into a plurality of regions that are each associated with an identifier. For example, a slot represents a specified amount of the memory 215 and is associated with an address, allowing data stored in the slot to be retrieved using the address. Hence, different data may be stored in different slots and subsequently retrieved based on the identifiers associated with the slots.

The memory allocation module 220 distributes storage of content between multiple client devices 110 and allocates portions of the memory 215 for use by various content sources 130. In various embodiments, the memory allocation module 220 determines whether a size of content from a content source 130 exceeds an amount of memory 215 allocated for use by the content source 130 and requests use of a portion of a memory of an additional client device 110 for storing a portion of the content. For example, the memory allocation module 220 determines a portion of content from a content source 130 to be stored in the memory 215 of the client device 110 and identifies an additional portion of the content for storage in a memory 215 of the additional client device 110. When the memory allocation module 220 determines the amount of memory 215 allocated for use by the content source 130 is sufficient to store the content, the memory allocation module 220 retrieves the additional portion of the content from the additional client device 110 and generates the content by combining the portion of the content stored in the memory and the additional portion of the content stored by the additional client device 110. Distribution of memory for storing content across multiple client devices 110 is further described below in conjunction with FIG. 3.

Additionally, the memory allocation module 220 allocates portions of the memory 215 of the client device 110 for storing content received from different content sources 130. In one embodiment, the memory allocation module 220 identifies content received from different content sources 130 and determines a measure of usability of content received from different content sources 130. Based on the measures of usability, the memory allocation module 220 determines a quality score for various content sources 130 and allocates a portion of the memory 215 for a content source 130 based on the quality score of the content source 130. For example, the memory allocation module 220 determines a total quality score by combining quality scores for all content sources 130 from which content was received and determines a ratio of the quality score of a content source to the total quality score; an amount of memory 215 is allocated for the content source 130 based on the ratio. In one embodiment, a percentage of memory 215 available is allocated for a content source 130 based on the ratio of the quality score for the content source 130 to the total quality score. Allocation of amounts of the memory 215 for content sources 130 is further described below in conjunction with FIG. 4.

A display device 225 presents content and other information to a user of the client device 110. Examples of the display device 225 include a liquid crystal display (LCD), an organic light emitting diode (OLED) display, an active matrix liquid crystal display (AMLCD), or any other suitable device. Different client devices 110 may have display devices 225 with different sizes, different resolutions, or other different characteristics.

For purposes of illustration, FIG. 2 shows a single input device 230; however, the client device 110 may include multiple input devices 230 in various embodiments. The input device 230 receives input from a user of the client device 110. Examples of the input device 230 include a touch-sensitive display, a keyboard, a dial pad, a mouse, and a trackpad. Using a touch-sensitive display allows the client device 110 to combine the display device 225 and the input device 230, simplifying user interaction with presented content. Inputs received via the input device 230 are be processed by the processor 205 and may be communicated to a content source 130 or to another client device 110 via the communication module 235.

The communication module 235 transmits data from the client device 110 to another client device 110 or to a content source 130 via the network 120. Additionally, the communication module 235 receives data via the network 120 (e.g., data from another client device 110 or a content source 130) and communicates the received data to one or more components of the client device 110. For example, the communication module 235 is a wireless transceiver configured to transmit data using one or more wireless communication protocols. Example wireless communication protocols include: Global System of Mobile (GSM), Code Division, Multiple Access (CDMA), General Packet Radio Service (GPRS), third-generation (3G) mobile, fourth-generation mobile (4G), High Speed Download Packet Access (HSDPA), High Speed Uplink Packet Access (HSUPA), Long-Term Evolution (LTE) and Worldwide Interoperability for Microwave Access (WiMAX). In some embodiment, the communication module 235 enables connection to the network 120 through a wired communication protocol such as Ethernet. While FIG. 2 shows a single communication module 235, multiple communication modules 235 may be included in a client device 110 in some embodiments.

Memory Allocation Between Multiple Client Devices

Figure 3:
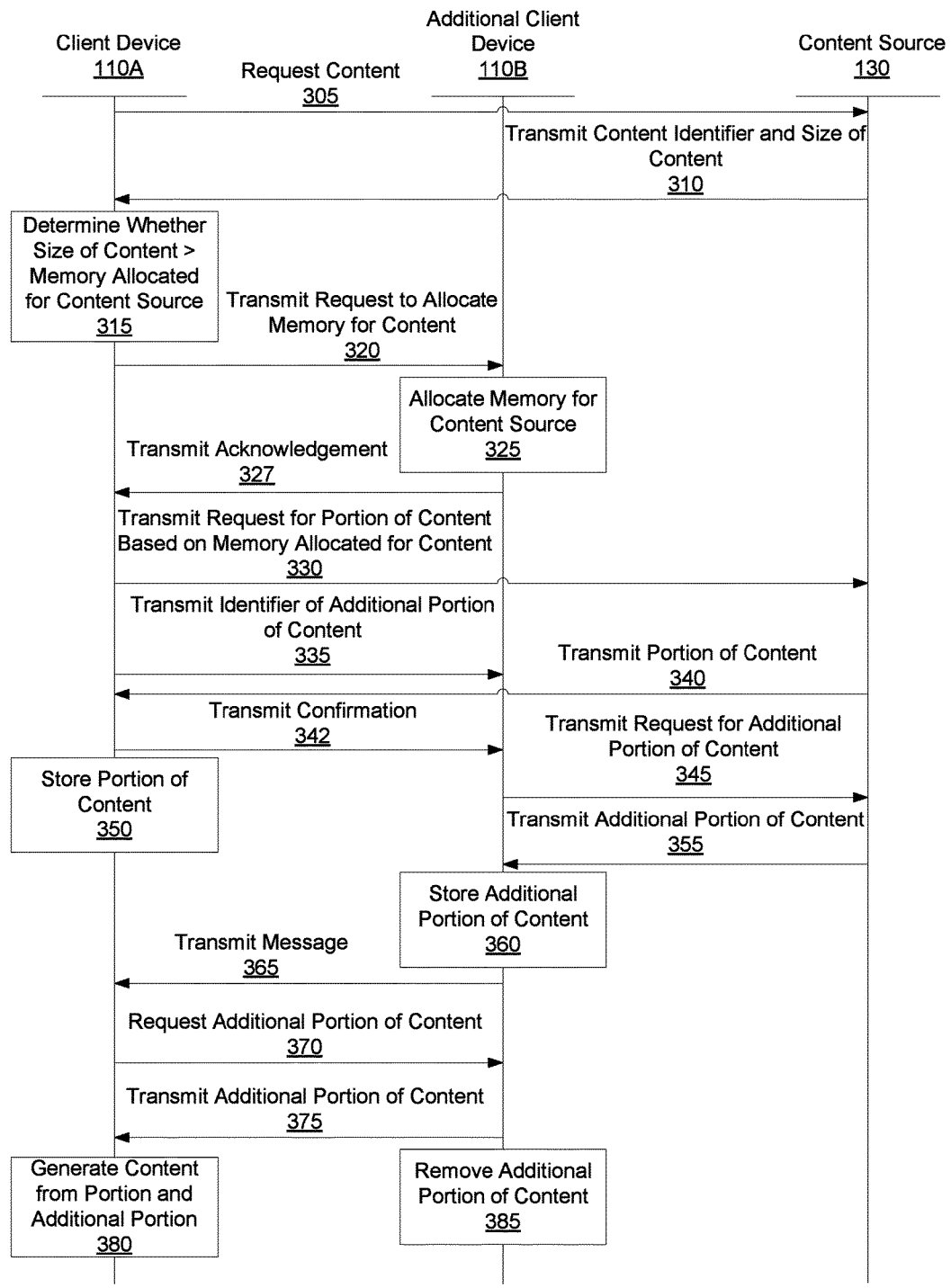
FIG. 3 is an interaction diagram of a method for distributing memory for content between multiple client devices, in accordance with an embodiment.

FIG. 3 is an interaction diagram of a method for distributing memory for content between multiple client devices 110. While FIG. 3 shows an example where memory for storing content is allocated among two client devices 110A, 110B, in other embodiments memory may be allocated between any number of client devices. Additionally, other embodiments may include different or additional steps than those shown in FIG. 3.

A client device 110A requests 305 content from a content source 130. For example, the client device 110A requests text, audio, or video data from the content source 130. The content source 130 transmits 310 a content identifier associated with content and an indication of the size of the content to the client device 110A. The size of the content indicates an amount of memory for storing the content. For example, if memory is partitioned into various slots, the size indicates a number of slots for storing the content.

When the client device 110A receives the content identifier and the size of the content from the content source 130, the client device 110A determines 315 whether the size of the content exceeds an amount of memory allocated by the client device 110A for the content source 130. In various embodiments, the client device 110A allocates different portions of a memory 215 of the client device 110A for different content sources 130, so content received from a content source 130 is stored in the portion of the memory 215 associated with the content source 130 by the client device 110A. For example, the client device 110A compares a number of slots of the memory allocated for the content source 130 to a number of slots indicated by the size of the content.

If the client device 110A determines 315 that the size of the content does not exceed the amount of memory allocated for the content source 130 by the client device 110A, the client device 110A requests the content from the content source 130 and subsequently receives the content from the content source 130. The client device 110A then stores the content in the memory 215 allocated for the content source 130, allowing subsequent retrieval of the content from the memory 215 of the client device 110A. However, if the client device 110A determines 315 that the size of the content exceeds the amount of memory allocated for the content source, the client device 110A transmits 320 a request to an additional client device 110B to allocate memory for the content. The request includes the content identifier and information identifying a set of the content to be stored on the additional client device 110B.

In one embodiment, the additional client device 110B transmits a message to the client device 110A specifying if the additional client device 110B is capable of allocating memory for the content. If the message indicates the additional client device 110B is unable to allocate memory for the content, the client device 110A transmits a request to another client device to allocate memory for the content. In some embodiments, the message transmitted from the additional client device 110B to the client device 110A specifies an amount of memory that the additional client device 110B is capable of allocating for the content. The client device 110A may then transmit additional requests to other client devices 110 to allocate memory for the content based on the amount of memory the additional client device 110B is capable of allocating for the content. For example, if the client device 110A determines 315 it has memory allocated for the content source 130 capable of storing 50% of the content, the client device 110A transmits 320 a request to the additional client device 110B to allocate memory for the content. In this example, the additional client device 110B transmits a message to the client device 110A that the additional client device 110B is capable of allocating an amount of memory in which 40% of the content is capable of being stored; hence, the client device 110A and the additional client device 110B have available memory to store 90% of the content, so the client device 110A transmits a request to one or more additional client devices 110 to allocate memory for storing the remaining 10% of the content. The client device 110A stores an association between the content identifier and an identifier associated with the additional client device 110B, as well as identifiers associated with other client devices 110, having allocated memory for storing the content.

The additional client device 110B allocates 325 memory for the content source 130, and transmits 327 an acknowledgment to the client device 110A indicating the additional client device 1 allocated 325 an amount of memory for the content source 130. In some embodiments, the additional client device 110B may transmit a message to the client device 110A if the additional client device 110B is unable to allocate 325 memory for the content source 130.

After receiving the acknowledgement that the additional client device 110B has allocated 325 memory for the content source, the client device 110A transmits 330 a request for a portion of the content to the content source 130. The size of the portion of the content is determined based on the amount of memory allocated for the content source 130 by the client device 110A and the size of the content. For example, the client device 110A transmits 330 a request to the content source 130 for a portion of the content having a size equaling the amount of memory allocated for the content source 130 by the client device 110A. Alternatively, the client device 110A transmits 330 a request for a portion of the content having a size that is a specified amount of the amount of memory allocated for the content source 130 by the client device 110A. For example, the client device 110A allocates a specified number of slots of memory 215 for the content source 130, and a request for a number of slots of the content less than or equal to the specified number of slots is transmitted 330 from the client device 110A to the content source 130.

The content source 130 transmits 340 the portion of the content to the client device 110A, which stores 350 the portion of the content in the memory allocated for the content source 130. Additionally, the client device 110A transmits 335 an identifier of an additional portion of the content to be stored by the additional client device 110B. The identifier includes the content identifier associated with the content and information for retrieving the additional portion of the content from the content source 130. For example, the content comprises a plurality of slots, with each slot associated with an identifier, and the request includes an identifier of an initial slot of the additional portion of the content.

When the client device 110A receives the portion of the content from the content source 130, the client device 110A transmits 342 a confirmation message to the additional client device 110B. In some embodiments, the client device 110A transmits 342 the confirmation message after storing 350 the portion of the content. After receiving the confirmation message, the additional client device 110B transmits 345 a request for the additional portion of the content to the content source 130 based on the identifier of the additional portion of the content. The request includes the content identifier and information for retrieving the additional portion of the content, such as an identifier associated with an initial slot of the additional portion of the content and a number of slots comprising the additional portion of the content. In some embodiments, the additional client device 110B receives a cancellation message from the client device 110A if the client device 110A does not receive the portion of the content and frees the memory allocated for the content source when the cancellation message is received.

After receiving the request for the additional portion of the content, the content source 130 transmits 355 the additional portion of the content to the additional client device 110B, which stores 360 the additional portion of the content in the memory allocated for the content source by the additional client device 110B. When the additional portion of the content is stored 360 by the additional client device 110B, a message is transmitted 365 from the additional client device 110B to the client device 110A indicating that the additional portion of the content has been stored 360 by the additional client device 110B. For example, the message transmitted 365 by the additional client device 110B includes the content identifier and an acknowledgment that the additional client device 110B has stored 360 the additional portion of the content. Hence, if the client device 110A has not allocated sufficient memory for the content source 130 to store the content, the client device 110A communicates with the additional client device 110B, which allocates a portion of the memory of the additional client device 110B so the content is stored by the client device 110A and the additional client device 110B. While FIG. 3 shows an example where content is partitioned among the client device 110A and the additional client device 110B, in other embodiments content is partitioned among the client device 110A and multiple other client devices 110.

When additional memory associated with the content source 130 becomes available on the client device 110A, the client device 110A requests 370 the additional portion of the content from the additional client device 110B. The additional portion of the content is transmitted 375 from the additional client device 110B to the client device 110A, which generates 380 the content from the portion of the content and the additional portion of the content. For example, the client device 110A transmits the content identifier of the content to the additional client device 110B, which transmits 375 data associated with the content identifier and stored by the additional client device 110B, such as identifiers associated with one or more slots of the additional portion of the content. In one embodiment, the additional client device 110B transmits 375 the content identifier and an identifier associated with an initial slot of the additional portion of the content, and the client device 110A generates 380 the content by appending slots associated with the additional portion of the content to the portion of the content. Hence, based on slot identifiers associated with one or more slots of the portion of the content and slot identifiers associated with one or more slots of the additional portion of the content, the additional portion of the content and the portion of the content are combined to generate 380 the content, which is stored by the client device 110A.

The additional client device 110B removes 385 the additional portion of the content from its memory after transmitting 370 the additional portion of the content to the client device 110A. For example, the client device 110A transmits an acknowledgement to the additional client device 110B when the additional portion of the content is received by the client device 110A or after the client device 110A generates 380 the content, and the additional client device 110B removes 385 the additional portion of the content after receiving the acknowledgment. Additionally, in some embodiments, the additional client device 110B removes 385 the additional portion of the content after a specified time interval, even if the additional portion of the content was not transmitted 375 to the client device 110A.

Allocation of Client Device Memory

Figure 4:
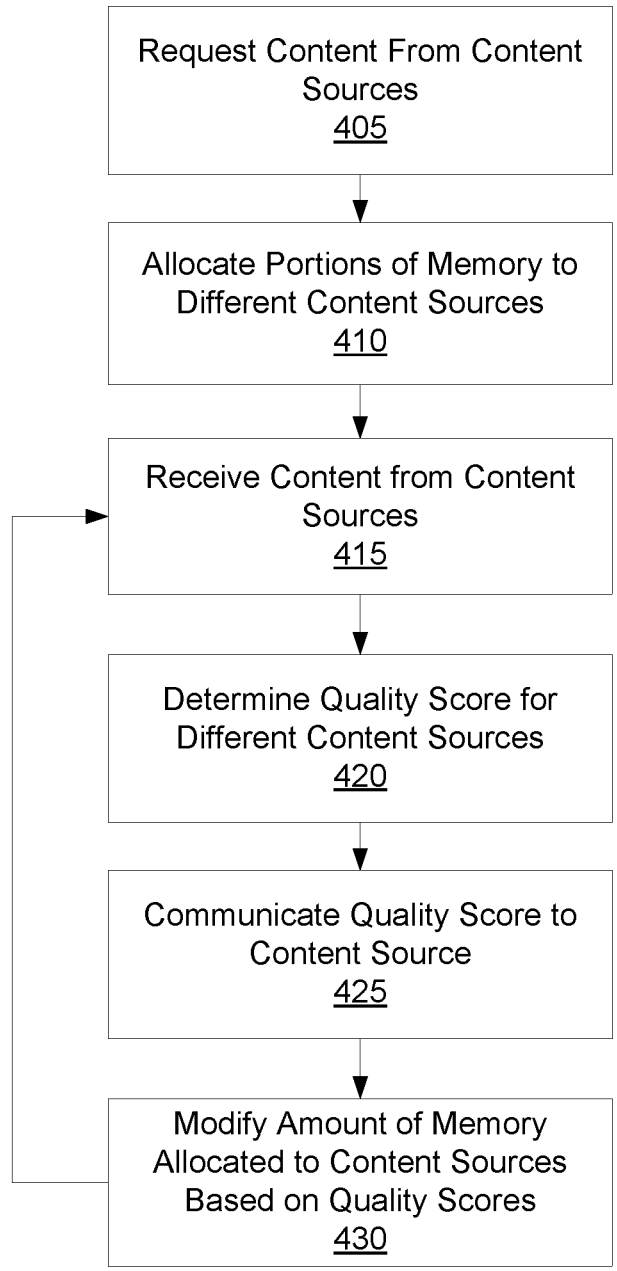
FIG. 4 is a flow chart of a method for allocating memory of a client device among content from multiple content sources, in accordance with an embodiment.

FIG. 4 is a flow chart of a method for allocating memory of a client device 110 among content from multiple content sources 130. In various embodiments, the steps shown by FIG. 4 may be performed in different orders. Additionally, other embodiments may include different or additional steps than those shown in FIG. 4. In one embodiment, a client device 110 includes instructions that cause a processor 205 included in the client device 110 to perform the steps described in conjunction with FIG. 4 when executed by the processor 205.

During a time frame, the client device 110 requests 405 content from multiple content sources 130 and initially allocates 410 available portions of a memory 215 of the client device 110 for different content sources 130. In one embodiment, the client device 110 requests 405 content from a specified number of content sources 130 and initially allocates 410 equal portions of the available memory for each content source 130. For example, the client device 110 requests 405 content from four content sources 130, and allocates 410 25% of the available memory for each of the four content sources 130. Alternatively, the client device 110 initially allocates 410 available portions of the memory 215 for various content sources 130 based on historical interaction with content from the content sources 130 by a client device user. In other embodiments, the client device 110 initially allocates 410 available memory for various content sources 130 based on amounts of memory previously allocated for different content sources 130. The client device 110 limits storage of content from a content source 130 to a portion of the memory allocated 410 for the content source 130.

The client device 110 receives 415 content from various content sources 130 and stores content from a content source 130 in a portion of the available memory allocated for the content source 130. For each content source 130 from which content was received, the client device 110 determines 420 a quality score. The quality score determined 420 for a content source 130 provides a measure of the usability of the content received 415 from the content source 130. Content's usability is based on attributes of the content and prior interactions by a user of the client device 110 with additional content having matching or similar attributes to the content. For example, a measure of usability is proportional to a frequency with which the user previously interacted with additional content having at least a threshold number of attributes matching, or similar to, attributes of the content with which the user frequently interacted has a higher measure of usability than content or is proportional to a number of prior interactions by the user with additional content having at least the threshold number of attributes matching, or similar to, attributes of the content. In some embodiments, different types of interactions with content are associated with different weights, and a measure of usability for received content is determined based on a number of different types of prior interactions with content having at least a threshold number of attributes matching, or similar to, attributes of the content and the weights associated with the types of interactions. Example attributes of content include: a content source 130 associated with the content, a resolution of the content, metadata associated with the content (e.g., an author, a genre, a summary, a title, a date, etc.), a size of the content, or other suitable information associated with the content. Additionally, characteristics of the client device 110 may be used to modify the measure of usability of content. For example, the size of a display device 225, the resolution of a display device 225, a connection strength between the client device 110 and the content source 130, a type of connection between the client device 110 and the content source 130, an amount of bandwidth available to the client device 110, or other characteristics of the client device 110 may be compared to attributes of content, with the comparison modifying the measure of usability of the content.

In one embodiment, the quality score for a content source 130 is a ratio of a measure of usability of the content received 415 from the content source 130 to a total measure of usability of content received from multiple content sources 130. For example, a quality score for a content source 130 is a ratio of a measure of usability of content received from the content source to a total measure of usability of content received from all content sources 130 from which content was received 415. However, in other embodiments, the quality score for a content source 130 may be any suitable value based on the usability of content received from the content source 130.

In some embodiments, the client device 110 determines a quality factor for each content item received from a content source 130. For example, a content source 130 provides the client device 110 with information describing multiple content items, and the client device 110 determines a quality factor for each content item based on the provided information. The quality factors for individual content items may be communicated to a content source 130 from which the content items were received, allowing the content source 130 to account for the quality factor along with other information about a user of the client device 110 maintained by the content source 130 to modify content subsequently selected for the user by the content source 130. Additionally, the quality factor associated with a content item may be presented to a user of the client device 110 may be presented to the user along with a description of the content item to provide the user with information describing memory allocation The client device 110 may communicate 425 the quality score for a content source 130 to the content source 130. A content source 130 may use the quality score to modify subsequent selection of content for use by the client device 110. For example, a content source 130 modifies types of content items or attributes of content items subsequently selected if the quality score is less than a threshold value. This allows a content source 130 to provide the client device 110 with increasingly usable content over time, which may improve interaction with content from the content source 130 by a user of the client device 110.

Based on the quality scores, the client device 110 modifies 430 the amount of memory allocated for different content sources 130. In one embodiment, the amount of memory allocated for a content source 130 is modified 430 to an amount that is proportional to the quality score associated with the content source 130. A ratio of a quality score of a content source 130 to a total quality score from the quality scores associated with all content sources 130 form which content was received 415 is used to modify 430 the memory allocation. For example, if a quality score associated with a content source 130 is 0.7 and a quality score associated with another content source 130 is 0.3, the amount of memory allocated for the content source 130 is modified 430 to (0.7)/(0.3+0.7), or 70%, of the available memory while the amount of memory allocated for the additional content source 130 is modified 430 to (0.3)/(0.7+0.3), or 30%, of the available memory. Hence, in some embodiments, the amount of memory allocated for a content source 130 is a percentage of the available memory determined by a percentage of the quality score of the content source 130 of the total quality scores associated with content sources 130 from which content was received 415.

In other embodiments, the memory allocated for a content source 130 is modified 430 in any suitable manner. For example, content sources 130 from which content is received 415 are ranked based on their quality scores. Based on the ranking, amounts of memory are allocated for various content sources 130. In one embodiment, different positions in the ranking are associated with percentages of memory 215, and a content source 130 is allocated an amount of memory based on its position in the ranking.

As additional content is received 415 from various content sources 130, the client device 110 determines 420 additional quality scores for the various content sources 130 based on the additional content, as described above. Based on the additional quality scores, the client device 110 modifies 430 the amount of memory allocated for the various content sources, allowing the client device 110 to dynamically modify 430 memory allocation among various content sources 130 as content is received. The additional quality scores may also be communicated 425 to the content sources 130 to allow the content sources to further improve selection of content for communication to the client device 110.

While FIGS. 3 and 4 describe embodiments where a client device 110 obtains content from a content source 130 external to the client device 110, the methods described in conjunction with FIGS. 3 and 4 may be used to allocate memory for content obtained from content providers internal to the client device 110. For example, a client device 110 may allocate memory 215 for storing content included in the storage device 110 and associated with various applications executing on the client device 110 as described above in conjunction with FIG. 3 or may distribute inclusion of content associated with an application executing on the client device 110 between the memory 215 of the client device 110 and a memory 215 of an additional client device 110. Further, memory may be allocated or distributed as described above in conjunction with FIGS. 3 and 4 for content received from a combination of content sources 130 external to a client device 110 and internal to the client device 110.

As described above in conjunction with FIG. 4, the quality scores associated with content sources 130 may be used to allocate memory 215 of a client device 110 for various content sources 130; however, the client device 110 may use the quality scores to provide other functionality. In one embodiment, the client device 110 may rank content sources 130 based on their associated quality scores, and present content received from various content sources 130 based on the ranking. For example, received content is search results received from different search providers, and the client device 110 ranks the search providers based on their associated quality scores. Based on the ranking of the search providers, the client device 110 presents search results received from different search providers; for example, the client device 110 presents a listing of search results received from various search providers, with search results located in the listing based in part on the position of the search provider from which the search results were received in the ranking. In one embodiment, search results from search providers having a higher position in the ranking are presented in more prominent position in the listing. Alternatively, a number of search results from a search provider proportional to a ratio of the quality score of the search provider to a total quality score, which is determined from combining quality scores associated with the search providers, are included in the listing.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, carried out by a client device, comprising:
    allocating portions of a memory of the client device to a plurality of content sources, each of the plurality of content sources being initially allocated with a respective portion of the memory;
    receiving, via a network, content from each of the plurality of content sources in the respective portion of the memory initially allocated to each of the plurality of content sources;
    determining a usability of the received content from each of the plurality of content sources, wherein the usability of the received content from each of the plurality of content sources is based on prior interactions between a user of the client device and additional content from each of the plurality of content sources;
    determining a quality score for each of the plurality of content sources based at least in part on the usability of the received content from each of the plurality of content sources, wherein the quality score is determined at least by:
        identifying one or more attributes of the received content from each of the plurality of content sources;
        determining the prior interactions between the user of the client device and the additional content having one or more attributes matching the identified one or more attributes of the received content from each of the plurality of content sources; and determining the quality score for each of the plurality of content sources based at least in part on the determined prior interactions between the user of the client device and the additional content having the one or more attributes matching the identified one or more attributes of the received content from each of the plurality of content sources; and modifying a size of the respective portion of the memory initially allocated to each of the plurality of content sources based at least in part on the quality score for each of the plurality of content sources.

2. The method of claim 1, wherein modifying the size of the respective portion of the memory initially allocated to each of the plurality of content sources further comprises:

determining a total quality score from the quality score for each of the plurality of content sources;

determining a ratio of the quality score for each of the plurality of content sources to the total quality score; and modifying the size of the respective portion of the memory initially allocated to each of the plurality of content sources based on the ratio.

3. The method of claim 2, wherein modifying the size of the respective portion of the memory initially allocated to each of the plurality of content sources based on the ratio comprises:

modifying the respective portion of the memory initially allocated to each of the plurality of content sources to a percentage of the memory equaling the ratio.

4. The method of claim 1, further comprising:

transmitting the quality score for each of the plurality of content sources to each of the plurality of content sources.

5. The method of claim 1, wherein the quality score for each of the plurality of content sources is further based at least in part on one or more characteristics of the client device.

6. The method of claim 1, wherein each of the plurality of content sources is initially allocated with the respective portion of the memory based on historical interactions with content from each of the plurality of content sources by a user of the client device.

7. The method of claim 1, wherein each of the plurality of content sources is initially allocated with the respective portion of the memory based on an amount of memory previously allocated for each of the plurality of content sources.

8. The method of claim 1, further comprising:

assigning weights to the determined prior user-interactions between the user of the client device and the additional content having the one or more attributes matching the identified one or more attributes of the received content from each of the plurality of content sources; and wherein determining the quality score for each of the plurality of content sources is based at least in part on the assigned weights.

9. The method of claim 1, wherein the identified one or more attributes of the received content include one or more of a resolution of the received content, metadata associated with the received content, and a size of the received content.

10. The method of claim 5, wherein the one or more characteristics of the client device include one or more of a size of a display of the client device, a resolution of a display of the client device, a connection strength between the client device and a respective content source of the plurality of content sources, a type of connection between the client device and a respective content source of the plurality of content sources, and an amount of bandwidth available to the client device.

11. The method of claim 4, further comprising:

receiving, via the network, modified content from each of the plurality of content sources, the modified content being based at least in part on the quality score for each of the plurality of content sources transmitted to each of the plurality of content sources.

12. The method of claim 1, further comprising:

ranking each of the plurality of content sources based on the quality score for each of the plurality of content sources; and wherein modifying the size of the respective portion of the memory initially allocated to each of the plurality of content sources is based at least in part on the ranking.

* * * * *